Patented May 4, 1948

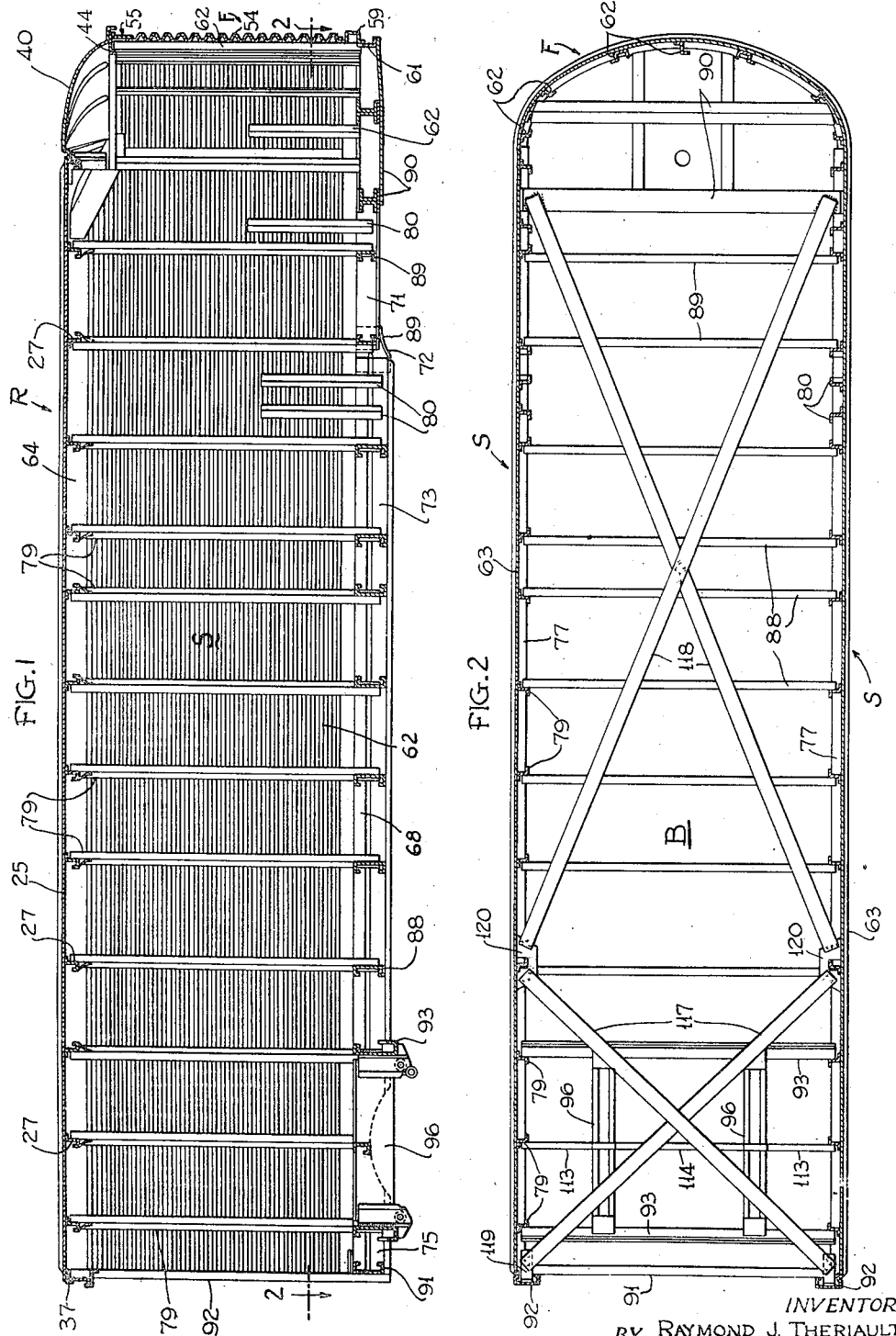

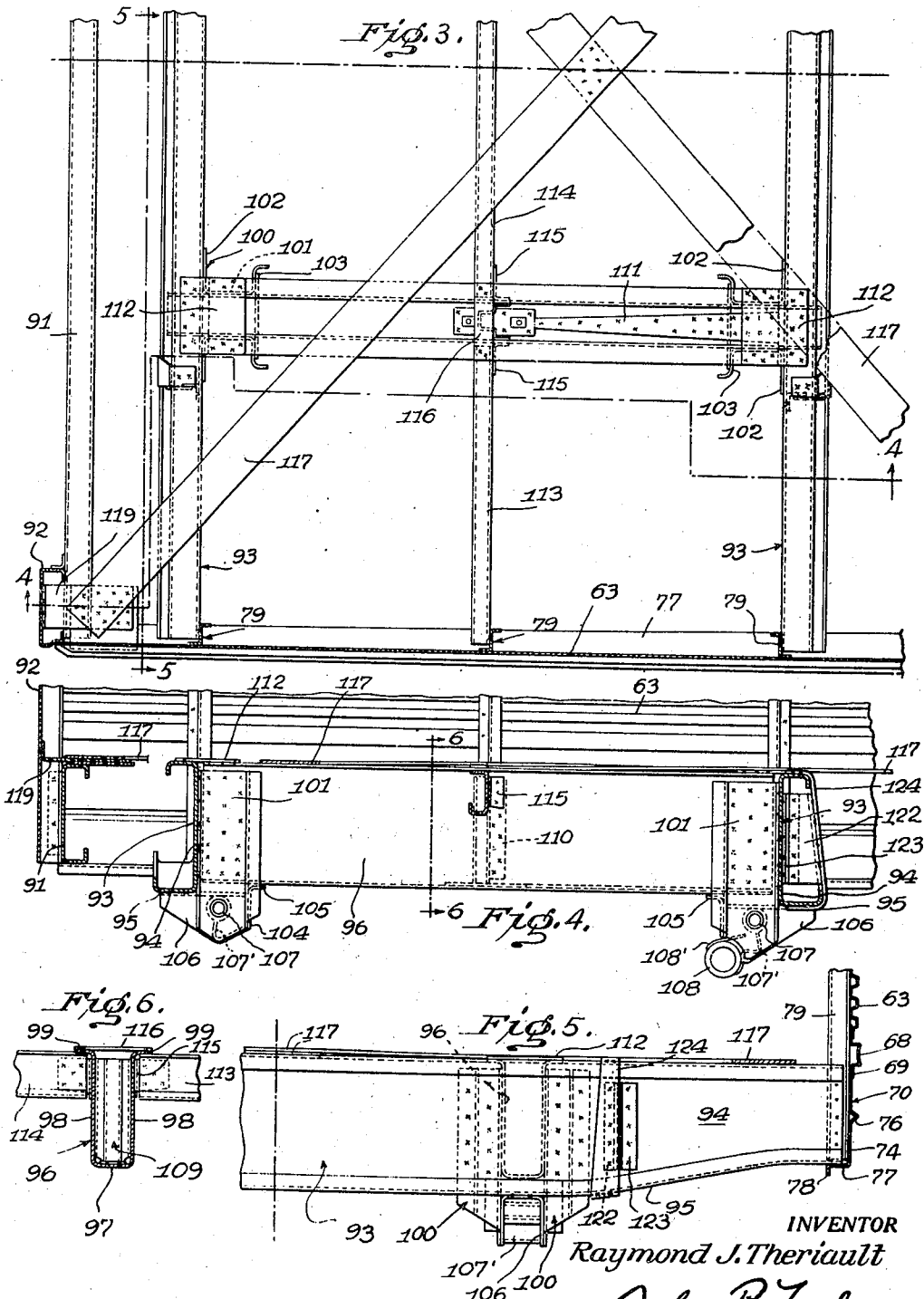

2,441,106

UNITED STATES PATENT OFFICE 2,441,106

UNDERFRAME STRUCTURE FOR VEHICLES, ESPECIALLY TRAILERS

Raymond J. Theriault, Glenside, Pa., assignor to The Budd Company, Philadelphia, Pa., a corporation of Pennsylvania Original application April 2, 1941, Serial No. 386,519. Divided and this application August 26, 1943, Serial No. 500,026

5 Claims. (Cl. 296—28)

1

The invention relates to improvements in vehicle body construction and more particularly in the underframe structure of large size commercial bodies such as semi-trailers, trailers, buses, etc.

Outstandingly, the invention is concerned with improvements of vehicle structures of the general construction disclosed in the inventor's Patent No. 2,172,571, Vehicle, of September 12, 1939, and abandoned application Serial No. 386,519, Vehicle structure especially trailer, filed April 2, 1941, of which latter the present application is a division.

Among the chief objects of the invention are: reduction of the dead weight, coupled with a corresponding increase of the admissible pay-load and decrease of the operating costs; maintenance or increase of the strength and durability; and simplification of the structure and its manufacture coupled with corresponding savings of manufacturing costs.

The last-named aims are, however, mostly not deciding factors for vehicles of the type in question, where every pound saved in dead weight and increased durability, even if attained at higher initial costs, pays high dividends on account of the increase of admissible pay-load, of the lowered maintenance costs, and of the decrease of lost time necessary for overhauling and repairing.

The above-outlined objects and aims of the invention and other objects are outstandingly attained by the novel formation of the underframe structure and of the spring attachment means.

Further objects, advantages and features of the invention will appear from the following description of a preferred embodiment thereof taken in connection with the attached drawings.

In the drawings:

Figure 1 is a vertical longitudinal section through the middle of a semi-trailer body.

Figure 2 is a plan view of the bottom structure and a section through the vertical body walls along line 2—2 of Figure 1.

Figure 3 is a fragmentary plan view of the rear corner portion of the body understructure similar to the corresponding portion of Figure 2, but on a larger scale.

Figures 4 and 5 are fragmentary sections respectively along lines 4—4 and 5—5 of Figure 3.

Figure 6 is a fragmentary section along line 6—6 of Figure 4.

The body shown in the drawings is a trailer body, and is of the so-called self-sustaining type, that is the running gear is directly attached to it without an intervening separate chassis frame. The body is composed of the following main elements, the roof unit R, the front wall unit F, the two side wall units S, the bottom or underframe structure B, and the rear doors (not shown) which constitute the major portion of the rear wall.

The roof R comprises a main panel 25 of longitudinally corrugated sheet material, preferably highly cold worked stainless steel of the so-called 18/8 type, that is, steel of 18% chromium and 8% nickel, the strength of which has been increased by about 50 to 100% or more through cold rolling. The panel 25 is transversely reinforced by a plurality of carlines 27 which are spaced from each other in longitudinal direction, its side margins are reinforced by angle section rails 33 (not shown), and its rear margin and the rear ends of the rails 33 are connected, as by spot welding, to a transverse angle section rail member 37 (Figs. 1 and 2). At the forward end, the roof panel 25 is supplemented by a longitudinally and transversely curved stamping 40 which extends across the entire width of the body and is connected with an angle section rail 44.

The front wall unit F is curved in plan view. It comprises a horizontally corrugated panel 54, an upper rail 55, a rub rail 59, an angle section skirt rail 61, and vertical posts 62, some of which do not extend over the entire height of the front wall—see Figure 1.

Each of the side wall units comprises a longitudinally corrugated main panel 63, and an upper rail 64, a rub rail 68, and skirt rail 70.

The skirt 70 is composed of a number of members 71, 72, 73, 74 and 75. The cross section of member 71 is about the same as the cross section of the skirt 61 of the front wall. The sections 73 and 75 are provided over their entire length with an outwardly projecting longitudinal reinforcing rib or beading 76 at about the middle of their height, and along their lower margin with an inwardly extending flange 77 ending in a narrow downwardly extending flange 78. The sections 72 and 74 serve as connections between the sections 71, 73 and 73, 75 respectively and are provided over part of their length with the reinforcing rib or beading 76. This skirt construction represents an improvement over the more complicated skirt construction of the bodies disclosed in applicant's earlier patent. It is not only simpler and cheaper than the earlier structure, but it is amply strong to take care of all the stresses to which this lower chord member may be subjected.

Vertical posts 79 of Z-section are connected to the panel 63, and to the rails 64, 68 and 70 at the same longitudinal intervals as the roof carlines 27. At certain especially highly stressed points short post members 80 are connected by the lower portion of the panel 63 and the rails 68, 70 so as to more evenly distribute the stresses over a wide area of the side wall which forms one of the main load supporting members of the body. It will also be noted that in certain regions (e. g. the region of the landing gear, not shown), the distance between successive posts or carlines is diminished so as to achieve increased strength and better stress distribution.

C-section transverse floor beams 88 are connected by their vertical webs to the lower ends of the webs of the Z-section side wall posts 79 in the region of the side wall skirt members 73. At the front end, beams 89 of similar C-section but of less height and a fifth wheel bolster 90 are employed. A rail 91 of similar C-section is arranged at the rear end of the vehicle. This rail 91 interconnects the lower ends of vertical door post members 92 which latter belong to the side wall units and have their upper ends connected to the rear transverse rail 37 to 39 of the roof unit. A bolster structure for supporting the rear wheels is arranged between the last beam 88 and rearward beam 91.

The bolster structure comprises two heavy transverse beams 93 of identical shape but facing in opposite directions. These beams are C-shaped in cross section, the opening of the forward beam faces forwardly and the opening of the rearward beam faces rearwardly. The webs 94 of both beams are arranged vertically and their ends are connected after the final assembly of the body to the lower ends of side wall post 79. The central portion of the lower wall 95 of each beam is downwardly offset so as to increase the height, whereas the height at the end of the beams is substantially the same as the height of the other transverse beams 88.

Inserted between the two beams 93 are longitudinal sill members 96. These members 96 are arranged in the region of the springs (not shown) for the rear wheels. The members 96 comprise a channel with a bottom wall 97, side walls 98, and lateral flanges 99. The openings of these channels face upwardly.

U-section members 100 have their bottom wall 101 fastened to the side walls 98 of the beams 96, one of their side walls 102 to the web 94 of one of the transverse beams 93, whereas the opposite side walls 103 of two members 100 are interconnected by a bridge piece 104 beneath the bottom wall 97 of the beams 96. The pieces 104 are angle-shaped in side elevation and have their second arms 105 arranged beneath the bottom wall 97 of the beam 96.

Downwardly facing U-section members 106 are inserted between the ends of the members 100 which project downwardly beyond the beam 96. The side walls of these members 106 are fastened to the adjoining bottom walls 101 of the members 100 whereas the bottom walls of the members 106 are fastened to the lower arm 95 of the beams 93. A bushing 107 extends between the two opposite members 100 at each end of the beam 96. Moreover, a sleeve or bushing 108 is fastened to the forward pair of members 100 and the member 106. The members 100 and 106 are transversely reinforced in the region of the bushings 107 and 108 by welded-in walls 107' and 108'. The sleeves 107, 108 serve for the attachment of the spring shackles or one eye of a leaf spring respectively (not shown).

Each beam 96 is reinforced at about its middle by a transverse U-section member 109 which is connected by flanges 110 to the side walls 98 of the beam 96. The bottom wall 97 of the beam 96 is furthermore reinforced in its forward section by a welded-on reinforcing strip 111. The ends of the flanges 99 are connected to the top wall of the beams 93 by bracket plates 112.

Rails 113, 114 of comparatively small height and substantially C-shaped in section are inserted respectively between a post 79 of the side wall and the middle of the next beam 96 or between the middle of the two beams 96. The connection between the rails 113, 114 and the beams 96 is effected by welding the top wall of those rails to the top flanges 99 of the beams 96, and by angle brackets 115 which are welded respectively to the vertical web of the rails and the vertical side walls 98 of the beams 96 in the region where the beams are reinforced by the members 109. The spaces between the ends of the rails 113, 114 are bridged by reinforcing plates 116 which extend across the open mouths of the beams 96 and are welded to the flanges 99.

The entire structure comprising the beams, 93, 96, the brackets 100, 106, the rails 113, 114 with all the described reinforcements are pre-assembled into a bolster unit, which is connected as such in a final assembly operation with the body side wall units. This bolster unit has likewise been proven very successful after extended severe tests, although this unit is lighter, and cheaper and easier to manufacture than the previously used bolsters.

A further increase of the stiffness of self-supporting body structures is achieved by a pair of X-braces formed by metal bands 117 and 118. These bands 117 have their rear ends fastened by spot welding to bracket plates 119 which are connected to the rear transverse beam 91 and the vertical rear door posts 92 as well as to the rub rails 68. The forward ends of the bands 117 and the rear ends of the bands 118 are fastened to the rub rails 68 and to one of the beams 88 by means of bracket plates 120. The forward ends of the bands 118 are fastened to the rear transverse member of the fifth wheel bolster 90. At the crossing points, the bands of each pair 117, 118 are rigidly connected such as by spot welding.

A flooring 121 (not shown) of any suitable material is directly supported by the tops of the beams 88, 89, 90, 93, 113, 114, and the diagonal bands 117, 118 and extends laterally into the rub rails 68.

For heavier loads, the wheel-supporting transverse beams 93 may be reinforced in the regions of the ends of the longitudinal beams 96. Such reinforcements consist of two angle section members 122, 123 which have one of their arms welded together so that they form a generally Z-section structure. One of the arms of this structure is welded to the web 94 of a beam 93, whereas the other free arm is welded to a metal band 124. This metal band has its ends bent over and welded to the horizontal top and bottom walls of the beam 93.

Substantially the entire body, with the exception of the floor 121 and the bushings 107, 108 for the springs consists preferably of high tensile stainless steel such as austenitic stainless steel with 18% chromium and 8% nickel, the strength of which has been increased by 50 to 100% through cold rolling. The connection between the different members is preferably effected by the "Shotweld" system which does not deleteriously influence the corrosion resistance properties and the cold-work strength of the stainless steel. Yet, the features of the invention may also prove useful if applied to other materials.

The invention is not restricted to the details of the illustrated and described embodiments, but the following claims are intended to cover all modifications which are based on the same principles as the one embodiment dealt with in detail.

What is claimed is:

1. In a vehicle underframe: a pair of transverse beams longitudinally spaced from each other and each having a substantially vertically arranged web; two hollow section longitudinal beams having spaced vertical side walls and arranged at a distance from each other between said transverse beams; a pair of brackets U-shaped in horizontal section at each end of each longitudinal beam; each bracket having one of its arms fastened to the web of a transverse beam, its web fastened to one side wall of a longitudinal beam and its other arm connected beneath said longitudinal beam to the corresponding arm of the other bracket of the same pair, said brackets having their lower ends which extend downwardly beyond said longitudinal beams adapted for the attachment of wheel-supporting means.

2. In a vehicle underframe structure: a first beam with a substantially vertically arranged web; a hollow section second beam with spaced vertical side walls arranged at an angle to and adjoining said first beam; and a pair of brackets U-shaped in horizontal section at the meeting point of the two beams; each bracket having one of its arms fastened to the web of the first beam, its web fastened to one of the side walls of the second beam and its other arm connected beneath said second beam to the corresponding arm of the other bracket, and said brackets having their lower ends which extend downwardly beyond said second beam adapted for the attachment of adjoining parts such as wheel-supporting means.

3. In a structure according to claim 2, a horizontal flange along a margin of the web of said first beam; lateral flanges along the margins of said side walls; and a gusset plate interconnecting said flanges of both said beams.

4. In a structure according to claim 2, said second beam having a bottom wall, and said other arms of said brackets being connected to one arm of an angle section gusset the other arm of which is secured to said bottom wall.

5. In a vehicle underframe: a first beam of angle section having a substantially vertically arranged arm and a laterally extending arm; a hollow section second beam with spaced vertical side walls adjoining said first beam and including an angle therewith; a pair of angle-shaped brackets, each having one of its arms fastened to one side wall of the second beam and its other arm to the vertical arm of the first beam; said brackets extending downwardly beyond said second beam and having the downwardly extended portions of their arms which are fastened to said side walls connected to the arms of a U-section member, the bottom wall of which is attached to said laterally extending arm of the first beam; the lower ends of said brackets and said U-section members being adapted for the attachment of parts of the running gear such as wheel-supporting means.

RAYMOND J. THERIAULT.

REFERENCES CITED

The following references are of record in the file of this patent:

UNITED STATES PATENTS

| Number | Name | Date |
|---|---|---|
| 690,207 | Vanderbilt | Dec. 31, 1901 |
| 699,340 | McLoughlin | May 6, 1902 |
| 778,706 | Rapley | Dec. 27, 1904 |
| 1,922,027 | Carter | Aug. 15, 1933 |
| 2,005,312 | Church | June 18, 1935 |
| 2,097,113 | Bradley | Oct. 26, 1937 |
| 2,172,571 | Theriault | Sept. 12, 1939 |